(12) United States Patent
Singhal et al.

(10) Patent No.: US 8,212,594 B2
(45) Date of Patent: Jul. 3, 2012

(54) METHODS AND APPARATUSES FOR CLOCK DOMAIN CROSSING

(75) Inventors: Rohit Singhal, Duluth, GA (US); Chris DeMarco, Alpharetta, GA (US)

(73) Assignee: Integrated Device Technology, Inc., San Jose, CA (US)

(*) Notice: Subject to any disclaimer, the term of this patent is extended or adjusted under 35 U.S.C. 154(b) by 147 days.

(21) Appl. No.: 12/854,702

(22) Filed: Aug. 11, 2010

(65) Prior Publication Data

US 2012/0038398 A1 Feb. 16, 2012

(51) Int. Cl.
*H03L 7/00* (2006.01)
(52) U.S. Cl. .................................. 327/144; 327/141
(58) Field of Classification Search .................. 327/147, 327/156, 141, 144
See application file for complete search history.

(56) References Cited

U.S. PATENT DOCUMENTS

| | | | |
|---|---|---|---|
| 6,900,674 B2 * | 5/2005 | Sutera et al. ................ | 327/144 |
| 6,954,869 B2 | 10/2005 | Syed | |
| 6,987,404 B2 * | 1/2006 | Duncan ........................ | 327/141 |
| 7,061,409 B1 | 6/2006 | Jäntti et al. | |
| 7,082,547 B2 | 7/2006 | Inohara | |
| 7,107,393 B1 | 9/2006 | Sabih | |
| 7,257,728 B2 | 8/2007 | Wilcox et al. | |
| 7,296,174 B2 | 11/2007 | Kelly | |
| 7,302,459 B2 | 11/2007 | Bossmeyer et al. | |
| 7,363,526 B1 | 4/2008 | Chong et al. | |
| 7,500,132 B1 | 3/2009 | Pothireddy et al. | |
| 7,562,244 B2 | 7/2009 | Wielage | |
| 2007/0208980 A1 | 9/2007 | Gregorius et al. | |
| 2009/0079600 A1 | 3/2009 | Noeske | |

OTHER PUBLICATIONS

Hogenauer, Eugene B., "An Economical Class of Digital Filters for Decimation and Interpolation," IEEE Transactions on Acoustics, Speech, and Signal Processing, vol. ASSP-29, No. 2, Sunnyvale, CA, Apr. 1981, pp. 155-162.

* cited by examiner

Primary Examiner — Hai L Nguyen
(74) Attorney, Agent, or Firm — TraskBritt P.C.

(57) ABSTRACT

Clock-domain-crossing systems and methods include an integrator that accumulates input samples over multiple clock cycles in a first clock domain to generate an accumulation result. Clock-domain-crossing circuitry samples the accumulation result in the first clock domain after each of a repeating accumulation count to generate a first domain accumulation. The first domain accumulation is sampled in a second clock domain after a time delay to generate a second domain accumulation. The time delay ensures proper setup and hold time parameters for the second clock domain relative to the first clock domain. A differentiator generates output information in the second clock domain by delaying the second domain accumulation and subtracting the delayed second domain accumulation from the second domain accumulation. The systems and methods preserve temporal characteristics of the input information in the first clock domain when it is transferred to the second clock domain as the output information.

25 Claims, 6 Drawing Sheets

METHODS AND APPARATUSES FOR CLOCK DOMAIN CROSSING

TECHNICAL FIELD

Embodiments of the present disclosure relate generally to data handling in digital circuits and, more particularly, to methods and apparatuses for passing data across different clock domains.

BACKGROUND

In many digital systems, it is sometimes necessary to move signals and signals containing data between different clock domains. These different clock domains may be at completely independent frequencies and phases, different only in frequency, different only in phase, or one clock domain may be derivative of the other clock domain. Problems can occur when moving signals between clock domains. If a flip-flop is clocking in a signal that originated in another clock domain, there may be no way to guarantee the necessary set-up and hold time for the flip-flop. As a result, it may not be possible to determine on which clock edge the flip-flop will detect a transition on the data input. Or, even worse, the flip-flop may become unstable and begin oscillating if the data input is transitioning at the same time as the active clock edge.

Meta-stable flip-flops (also referred to herein as meta-flops) have been proposed for dealing with these issues of meta-stability with some success. However, when applied to a data bus with many signals, using a meta-flop for each signal of the data bus can consume valuable real estate on semiconductor devices. In addition, if the various data signals on the data bus arrive at slightly different times, it may be impossible to guarantee that all the meta-flops on the data bus are clocking consistent data.

As another means of passing data between clock domains when going from a high-speed clock domain to a lower-speed clock domain a First-In-First-Out (FIFO) buffer may be used to buffer the data. However, a FIFO may only be practical when the data in the high-speed domain are bursty in nature, such that the average bandwidth in the high-speed domain does not exceed the maximum bandwidth in the low-speed domain. In addition, if the clocks are completely unrelated, a FIFO design may still require meta-flops on the inputs and include all the problems that meta-flops on busses may have. Moreover, FIFOs also consume large areas of a semiconductor die.

There is a need for improved apparatuses and methods for transferring information on data busses from one clock domain to another clock domain. Furthermore, there is a need for apparatuses and methods that can perform this clock domain crossing while preserving temporal characteristics of the information that may be important to some systems.

BRIEF SUMMARY OF THE INVENTION

Embodiments of the present invention include apparatuses and methods for transferring information on data busses from one clock domain to another clock domain. These apparatuses and methods also perform this clock domain crossing while preserving temporal characteristics of the information that may be important to some systems.

In one embodiment of the invention, an apparatus for crossing clock domains includes an integrator, circuitry for clock-domain-crossing, and a differentiator. The integrator accumulates input information in a first clock domain to generate an accumulation result. The clock-domain-crossing circuitry samples the accumulation result in the first clock domain after each of a repeating accumulation count in the first clock domain to generate a first domain accumulation. A time delay is generated after sampling the accumulation result and the first domain accumulation is sampled in a second clock domain after the time delay to generate a second domain accumulation. The differentiator generates output information in the second clock domain by delaying the second domain accumulation and subtracting the delayed second domain accumulation from the second domain accumulation.

In another embodiment of the invention, an apparatus for crossing clock domains includes an input signal including input information at a first clock frequency, an integrator, circuitry for clock-domain-crossing, and a differentiator. The integrator includes an adder with a first addend coupled to the input signal, a second addend coupled to an accumulation result, and an adder output. An accumulation register, clocked at the first clock frequency, includes an input operably coupled to the adder output and an output coupled to the accumulation result. The clock-domain-crossing circuitry includes a first domain register clocked at the first clock frequency that loads the accumulation result at a repeating accumulation count of the first clock frequency. A second domain register, clocked at a second clock frequency, loads an output of the first domain register a time delay after the first domain register is loaded to generate a second domain accumulation. A delay circuit generates the time delay. The differentiator includes a differentiation register clocked at the second clock frequency and includes an input coupled to the second domain accumulation and an output coupled to a delayed second domain accumulation. A subtractor includes a positive input operably coupled to the second domain accumulation, a negative input operably coupled to the delayed second domain accumulation, and an output signal including output information at the second clock frequency.

Yet another embodiment of the invention includes a method of passing data between different clock domains. The method includes accumulating input information in a first clock domain by adding input samples to an accumulation result to generate the accumulation result. The accumulation result is sampled in the first clock domain after each of a repeating accumulation count to generate a first domain accumulation. The first domain accumulation is sampled in a second clock domain a time delay after sampling the accumulation result to generate a second domain accumulation. The second domain accumulation is delayed by a clock cycle of the second clock domain. Finally, the delayed second domain accumulation is subtracted from the second domain accumulation to generate output information in the second clock domain.

Yet another embodiment of the invention is a method of passing data between different clock domains while preserving temporal characteristics of input information in a first clock domain when it is transferred to a second clock domain. The method includes adding input samples of the input information to an accumulation result at each clock in the first clock domain to generate the accumulation result. A sample signal is generated in the first clock domain for a last clock cycle of a span of consecutive clock cycles. The accumulation result is sampled in the first clock domain in response to the sample signal to generate a first domain accumulation. The sample signal is synchronized to the second clock domain to generate a second sample signal. The first domain accumulation is sampled in the second clock domain in response to the second sample signal to generate a second domain accumulation. A delayed second domain accumulation is generated by sampling the second domain accumulation. The delayed second domain accumulation is subtracted from the second domain accumulation to generate output information with preserved temporal characteristics relative to the input information.

DETAILED DESCRIPTION

Figure 1:
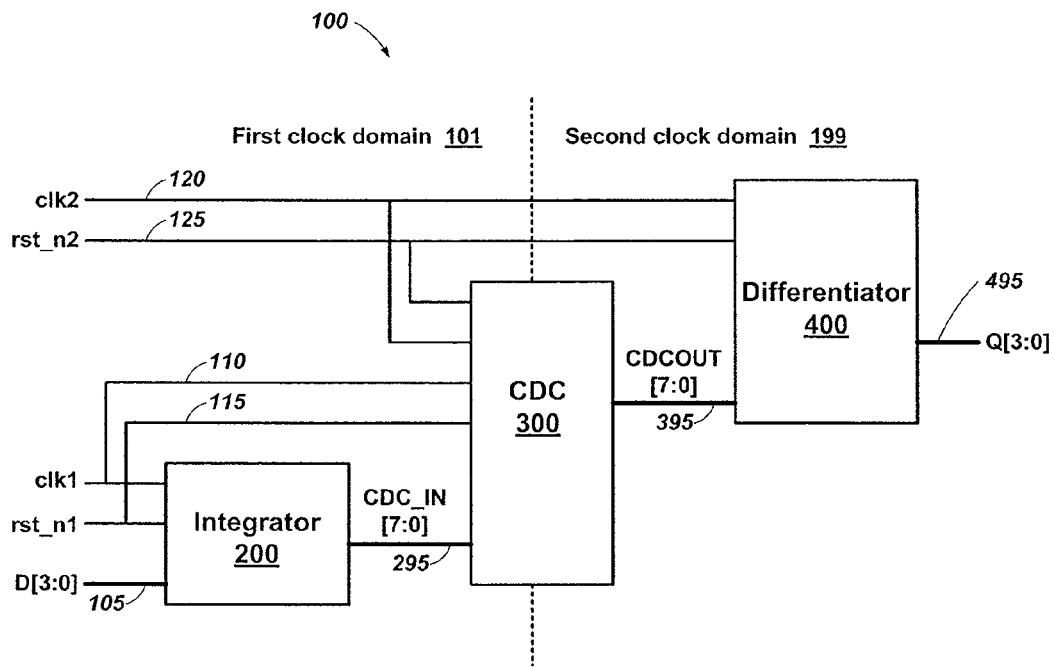
FIG. 1 is a simplified block diagram illustrating an apparatus for converting information between clock domains according to one or more embodiments of the present invention.

In the following description, elements, circuits, and functions may be shown in block diagram form in order not to obscure the present invention in unnecessary detail. Conversely, specific implementations shown and described are exemplary only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

Furthermore, in this description of embodiments of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is not to be taken in a limiting sense, and the scope of the present invention is defined only by the appended claims.

Those of skill in the art would further appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and steps are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the invention described herein.

The terms "assert" and "negate" may be respectively used when referring to the rendering of a signal, status bit, or similar apparatus into its logically true or logically false state, respectively. If the logically true state is a logic level one, the logically false state will be a logic level zero. Conversely, if the logically true state is a logic level zero, the logically false state will be a logic level one.

Those of skill would further appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and steps are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the invention described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise a set of elements may comprise one or more elements.

While embodiments of the present invention are described as logic blocks and logic gates embodiments of the invention described herein may be practiced in a wide variety of implementations, such as, for example, discrete gates and may types of many integrated circuits (ICs). These ICs may include a Field Programmable Gate Array (FPGA), an Application Specific Integrated Circuit (ASIC) an IC that includes a plurality of programmable function elements, an IC having a microprocessor, an IC having a Digital Signal Processor (DSP), an IC having a micro-controller, and combinations thereof.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). In other cases, the signal may be indicated by a numerical indicator (e.g., 110) and the information contained on the signal may be indicated in various examples with the numerical indicator followed by an alphabetic designator (e.g., 110A, 110B, etc.).

The terms "sample" and "sampling" as used herein refer to clocking a digital signal into a memory element, such as, for example, a latch, a flip-flop, a register of latches, a register of flip-flops, memories, or combinations thereof. Sampling in a conventional sense may generally refer to capturing an analog value from a sensor signal or other analog signal to convert the signal to a digital form. When that conventional sense is intended herein, it will be referred to as signal sampling or a process that generates signal samples.

Embodiments of the present invention include apparatuses and methods for transferring information on data busses from one clock domain to another clock domain. These apparatuses and methods also perform this clock domain crossing while preserving temporal characteristics of the information that may be important to some systems.

In describing embodiments of the present invention, the system is first described structurally with reference to FIGS. 1-5 to identify various elements that may be used in certain embodiments. Then, the system is described functionally, again with reference to FIGS. 1-5, to illustrate how the structural elements interact and illustrate how the overall system operates to resolve clock-domain-crossing issue that are useful for some data systems. Finally, with reference to FIGS. 6-8, example signals show data values at various locations within the system.

FIG. 1 is a simplified block diagram illustrating a clock crossing system 100 for converting information between clock domains according to one or more embodiments of the present invention.

An integrator 200 operates in a first clock domain 101 and includes inputs for an input signal 105, a first clock 110 at a first clock frequency, and a first domain reset 115. The integrator generates an accumulation result 295 by sampling and accumulating input information on the input signal 105 over multiple clock cycles. A differentiator 400 operates in a second clock domain 199 and includes inputs for a second domain accumulation 395, a second clock 120 at a second clock frequency, and a second domain reset 125. The differentiator 400 generates output information on an output signal 495 by subtracting data in a previous clock cycle from data in the current clock cycle. Clock-domain-crossing circuitry 300 operates in both the first clock domain 101 and the second clock domain 199 and, therefore, receives both the first clock 110 and the second clock 120 and both the first domain reset 115 and the second domain reset 125. The clock-domain-crossing circuitry 300 takes the accumulation result 295 in the first clock domain 101 and safely generates therefrom the second domain accumulation 395 in the second clock domain 199.

Figure 2:
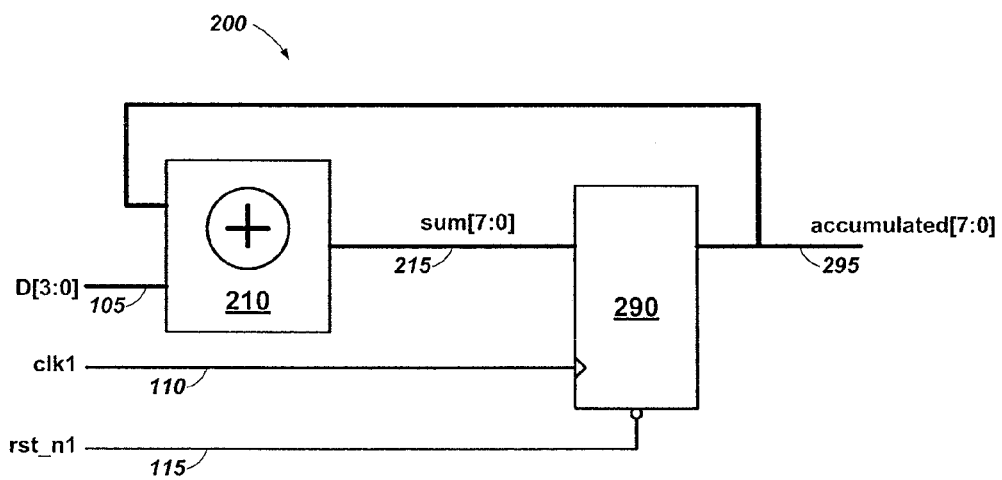
FIG. 2 is a simplified block diagram an integrator according to one or more embodiments of the present invention.

FIG. 2 is a simplified block diagram illustrating the integrator 200 according to one or more embodiments of the present invention. An accumulation register 290 is clocked by the first clock 110 to sample the sum 215 (also referred to herein as an adder output 215) from an adder 210. The accumulation result 295 is generated as an output from the accumulation register 290. The adder includes a first addend that is connected to the input signal 105 and a second addend that is connected to the accumulation result 295 as a feedback to create the accumulation of multiple input samples on each successive clock cycle of the first clock 110. The integrator 200 is reset when the first domain reset 115 is asserted.

Figure 3:
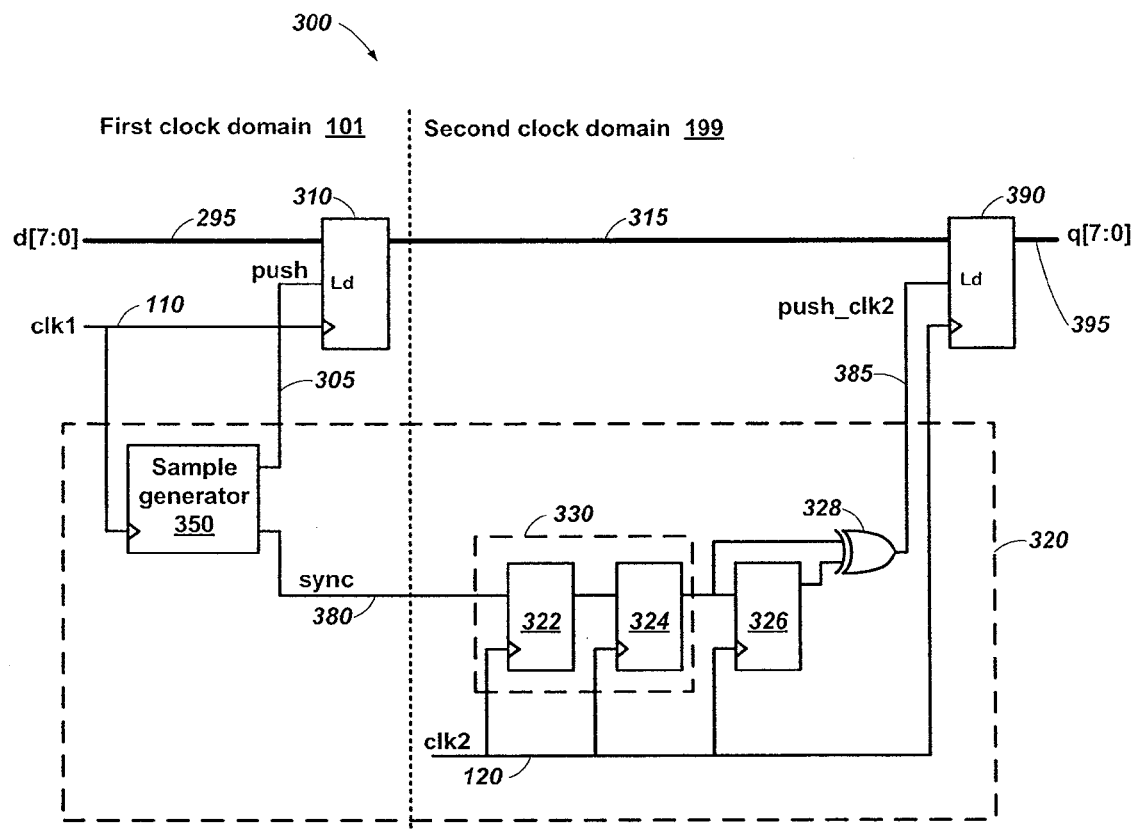
FIG. 3 is a simplified block diagram illustrating clock-domain-crossing circuitry according to one or more embodiments of the present invention.

FIG. 3 is a simplified block diagram illustrating clock-domain-crossing circuitry 300 according to one or more embodiments of the present invention. A first domain register 310, clocked by the first clock 110, samples the accumulation result 295 from the integrator 200 (FIG. 2) every time a first domain push signal 305 is asserted to generate a first domain accumulation 315. The first domain push signal 305 may also be referred to herein as a first domain sample pulse 305 and a transfer signal 305. The first domain accumulation 315 crosses from the first clock domain 101 to the second clock domain 199. A second domain register 390, clocked by the second clock 120, samples the first domain accumulation 315 every time a second domain push signal 385 is asserted. The second domain push signal 385 may also be referred to herein as a second domain sample pulse 385 and a second domain transfer signal 385.

A delay circuit 320 operates across both the first clock domain 101 and the second clock domain 199 to generate the first domain push signal 305 and the second domain push signal 385 at a time delay after the first domain push signal 305. In the first clock domain 101 a sample generator 350 counts clock cycles of the first clock 110 to generate the first domain push signal 305 and a synchronization signal 380 after a span of consecutive clock cycles. This span that the sample generator 350 counts creates a repeating accumulation count such that the accumulation result 295 is sampled by the first domain register 310 each time the repeating accumulation count is reached. In other words, the value of the accumulation result 295 from the integrator 200 (FIG. 2) is sampled periodically after each repeating N clock cycles of the first clock 110. Details of the function of the repeating accumulation count are discussed more fully below.

The synchronization signal 380 is sampled by a meta-flop 330. In the embodiment of FIG. 3, the meta-flop includes flip-flops 322 and 324. Of course, other designs for meta-flops for handling meta-stability issues when data and clock signal transitions occur close together may also be used. Furthermore, flip-flops 322 and 324 may be different from conventional flip-flops in that they may include specific circuit designs to reduce meta-stability issues.

A combination of flip-flop 326 and exclusive-or gate 328 creates a transition detector such that on each transition of the input to flip-flop 326, a pulse is generated on the second domain sample pulse 385. The combination of flip-flops 322, 324, and 326 may also be referred to as a shift register. As will be explained more fully below, some embodiments of the invention may include fewer or more elements in the shift register depending on the format of the synchronization signal, the structures used to perform the meta-flop functions, and a desired time delay between the first domain sample pulse 305 and the second domain sample pulse 385.

Figure 4:
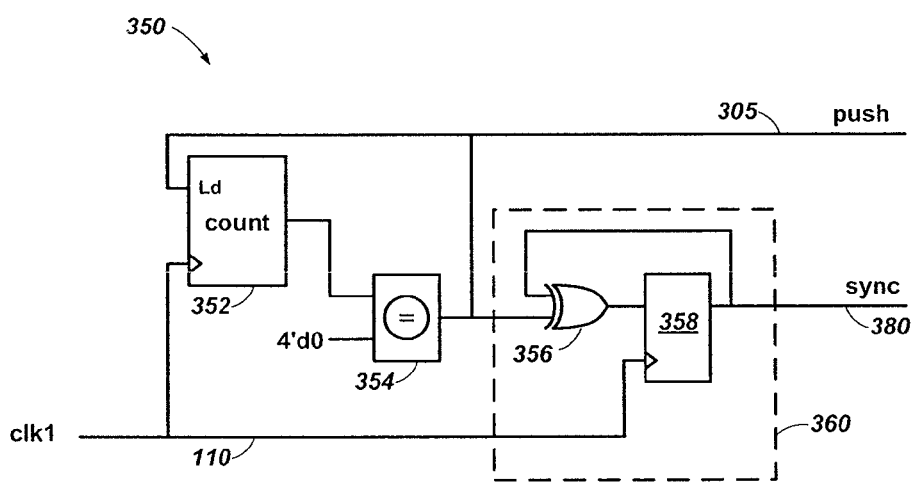
FIG. 4 is a simplified block diagram illustrating a sample generator according to one or more embodiments of the present invention.

FIG. 4 is a simplified block diagram illustrating a sample generator 350 according to one or more embodiments of the present invention. In the embodiment of FIG. 4, the sample generator 350 includes a counter 352 feeding a comparator 354 to generate the first domain push signal 305. The comparator 354 compares the output of the counter 352 to a value (in this case(0000)) and asserts the first domain push signal 305 when the comparison evaluates true. The first domain push signal 305 is connected to a transition generator 360 that generates a transition of the synchronization signal 380 in the first clock domain for each clock cycle the first domain push signal 305 is asserted. The transition generator 360 includes a flip-flop 358 and an exclusive-or gate 356 with one input connected as a feedback from the flip-flop 358 and the other input connected to the output of the comparator 354. As explained more fully below when discussing operation of the various function, other embodiments of the invention may include other circuits for generating the first domain push signal 305 and the synchronization signal 380.

Figure 5:
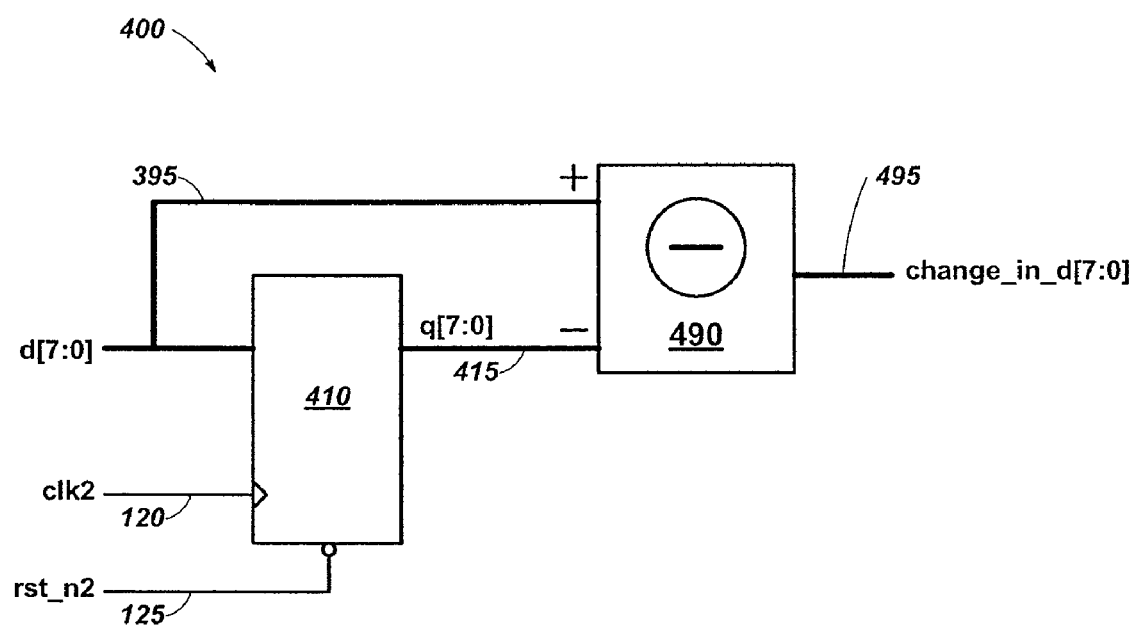
FIG. 5 is a simplified block diagram illustrating a differentiator according to one or more embodiments of the present invention.

FIG. 5 is a simplified block diagram illustrating the differentiator 400 according to one or more embodiments of the present invention. A differentiation register 410 samples the second domain accumulation 395 on each clock cycle of the second clock 120 to create a delayed second domain accumulation 415. The delayed second domain accumulation 415 is connected to a negative input of a subtractor 490 and is subtracted from the second domain accumulation 395 connected to a positive input on the subtractor 490 to generate the output signal 495 with output information in the second clock domain 199 (FIGS. 1 and 3). The differentiator 400 is reset when the second domain reset 125 is asserted.

Referring to FIGS. 1-5, the first clock 110 and the second clock 120 may be at different frequencies or just different phases. Furthermore, the clocks 110, 120 may be related in that one clock may be a derivative of the other clock (e.g., one clock may be divided down to generate the other clock) or the two clocks may be completely independent. Two reset signals, first domain reset 115 and second domain reset 125 are used to have reset signals synchronized to the different time domains and avoid potential meta-stability problems. Furthermore, for clarity the first domain reset 115 and second domain reset 125 are not shown in FIGS. 3 and 4 for clarity in the drawing. However, where resets may be needed, flip-flops connected to the first clock 110 would include the first domain reset 115 and flip-flops connected to the second clock 120 would include the second domain reset 125.

Some of the functions performed by the clock crossing system 100 are similar to functions performed by a type of signal processing filter conventionally known as a cascaded integrator comb (CIC) filter. CIC filters may be configured to up-sample or down-sample a stream of signal samples passing therethrough. A CIC filter that down-samples is most similar to embodiments of the clock crossing system 100. However, there are significant differences that make embodiments of the present invention different from, new, and able to perform new functions relative to implementations of a CIC filter.

Down-sampling CIC filters generally include an integrator stage followed by a down-sampler stage, followed by a comb stage. However, in a CIC, the integrator stage is generally configured as cascaded versions of single stage integrators. The number of cascaded integrators is selected based on a sample rate change desired between the input data stream and the output data stream. Similarly, the comb stage is generally configured as cascaded comb stages wherein the number of cascaded comb stages generally matches the number of cascaded integrator stages. Furthermore, the down-sampler stage of a CIC filter is configured to drop signal samples between the integrator stage and the comb stage. Thus, in a conventional CIC, the integrator stage, down-sampler stage, and comb stage may all operate in the same clock domain with the output signal just including dropped samples relative to the input signal.

In contrast, embodiments of the present invention include an integrator that accumulates signal samples using feedback of accumulated results rather than cascading multiple integrator stages of the CIC filter. Similarly, the differentiation in embodiments of the present invention can be implemented as a single subtractor and a delay stage rather than multiple comb stages used in a CIC filter. In even greater contrast, the clock-domain-crossing circuitry 300 of embodiments of the present invention move accumulated information safely from one clock domain to another clock domain, which is a function that conventional CIC filters do not perform.

For many data types that may be used in embodiments of the present invention, absolute bit accuracy of the output information relative to the input information may not be necessary. However, it may be beneficial to preserve temporal characteristics of the input signal 105 in the first clock domain 101 when it emerges from the clock crossing system 100 in the second clock domain 199. As a non-limiting example, the input information 105 may include information such as event counts or errors that may be present in a communications system at the receiving side relative to what was present on the transmission side. This communications system (not shown) may be at a high data rate such that analysis of the events or errors may be difficult in a high frequency clock domain of the very high data rate. As a result, it may be useful to monitor and capture the events or errors in the high frequency clock domain, but transfer them to a lower frequency clock domain where analysis can be substantially real time, the data can be stored for future analysis, or combinations thereof. In such systems, preserving the exact data may not be as important as preserving the temporal nature of the events or error counts. These preserved temporal characteristics may include information about the signal such as total count over a selected time period, whether the signal tends to be randomly spaced, whether the signal tends to be evenly spaced, whether the signal tends to be bursty, and combinations thereof.

With respect to the total count, as a non-limiting example for illustration, the input information 105 may include six successive signal samples of ABCDEF, where each letter signifies information that is clocked in on each successive clock cycle. After passing through the clock crossing system 100, the output information 495 may include three successive signal samples of A+B for a first signal sample, C+D for a second signal sample, and E+F for a third signal sample. Thus, the first signal sample of the output information 495 preserves the total count (i.e., sum) of the first two signal samples of the input information, the second signal sample of the output information 495 preserves the total count of the middle two signal samples of the input information 105, and the last signal sample of the output information 495 preserves the total count of the last two signal samples of the input information 105. Furthermore, the overall count (i.e., A+B+C+D+E+F) is the same on the input information 105 and the output information 495.

Embodiments of the present invention preserve these temporal characteristics. Function of the clock crossing system 100 will be described with reference to FIGS. 1-5. In general, a new signal sample will be present on the input signal 105 for each clock cycle of the first clock 110. The new signal sample is added to an accumulation of previous samples on the accumulation result 295, and then the sum 215 is stored in the accumulation register 290. As a result, the accumulation result 295 contains the total of all the input signal samples since the last reset was asserted. The integrator 200, as well as other elements of the clock crossing system 100 may be reset at certain times, such as, for example, during initialization, between messages of a communication system, or at other times that may be related to how events may be processed and analyzed.

As stated earlier, the accumulation result 295 is sampled by the first domain register 310 with the first clock 110 periodically when the first domain push signal 305 is asserted. The sample generator 350 asserts the first domain push signal 305 periodically depending on the frequency relationship between the first clock 110 and the second clock 120 and, possibly the synchronization circuitry that may be present, such as, for example, the transition generator 360, the meta-flop 330, and the transition detector (326 and 328). As a non-limiting example, in the embodiment shown in FIGS. 3 and 4, the time between pulses (also referred to herein as a repeating accumulation count) may be determined because of the clock and delay relationships. The maximum time from when the first domain push signal 305 is asserted, to when the second domain push signal 385 is asserted is 1 clock cycle of the first clock 110 (due to flip-flop 358) plus four clock cycles in the second clock 120 (due to the three flip-flops 322, 324, and 326 and a clock cycle before the second domain register 390 is clocked). This time delay can be represented as $(1/f_1 + 4/f_2)$. Assume the counter counts down $2^N$ first clock cycles because the counter is N bits wide. Thus, the time between second domain push signals is $2^N/f_1$. The total count should be defined to allow sufficient end-to-end delay. In other words, the time between second domain push signals should be greater than the delay from the first domain push signal 305 to the second domain push signal 385. This limitation can be expressed as: $(2^N/f_1) > (1/f_1 + 4/f_2)$, which can be re-written as $2^N > 1 + 4f_1/f_2$. Thus N should be chosen such that: $2_N > 1 + 4f_1/f_2 > 2_{N-1}$.

In the embodiment of FIGS. 3 and 4, the first domain push signal 305 is converted by the transition generator 360 such that for each clock cycle of the first clock 110 that the first domain push signal 305 is asserted, a transition will occur on the synchronization signal 380. As a result, there are half as many transitions on the synchronization signal 380 to pass from the first clock domain 101 to the second clock domain 199 and that need to be sampled by the meta-flop 330. After the meta-flop 330, the transition detector (326 and 328) converts each transition it detects to the second domain push signal 385.

The second domain register 390 clocks in the first domain accumulation 315 with the second clock 120 each time the second domain push signal 385 is asserted to complete the transition from the first clock domain 101 to the second clock domain 199. The time delay between the first domain push signal 305 and the second domain push signal 385 ensures proper setup and hold time parameters for the second domain register 390 in the second clock domain 199 relative to transition that may occur on the first domain accumulation 315 in the first clock domain 101.

In some embodiments, if the first clock 110 and the second clock 120 are running at the same frequency, but out of phase with each other, the sample generator 350 may keep the first domain push signal 305 asserted all the time that it is not reset. With reference to FIGS. 3 and 4, this may be accomplished by holding the counter 352 reset such that the comparator 354 always asserts true. Thus, the synchronization signal 380 will toggle every other clock cycle of the first clock 110 and the transition detector 328 in the second clock domain 199 will convert the transitions to keeping the second domain push signal 385 asserted all the time that it is not reset.

Of course, the first domain push signal 305 may be generated by many other suitable circuits for generating a signal to periodically indicate that the first domain register 310 should be loaded. In addition, crossing the clock domain to generate the second domain push signal 385 may be performed with many other suitable circuits. As a non-limiting example, in some embodiments, the transition generator 360 may be eliminated and the first domain push signal 305 may be sampled directly by the meta-flop 330 with the second clock 120. Thus, assuming the first domain push signal 305 is an active high signal, it would ripple down through the shift register and rather than using an exclusive-or gate in front of the last flip-flop 326, a pulse generator may be used with an AND gate with one input coupled to a Q-bar output of flip-flop 326 and one input coupled to an output of the next to last flip-flop 324. This pulse generator will generate a pulse in the second clock domain every time the output of the next to last flip-flop 324 transitions from a low to a high.

Bit widths for the data buses shown in FIGS. 1-5 are shown as examples of one embodiment. Those of ordinary skill in the art will recognize that other embodiments of the invention may include a wide variety of bit widths depending on the type of data being passed between clock domains. In the embodiment illustrated in FIGS. 1-5, the input signal 105 is four bits wide. All other buses (e.g., sum 215, accumulation result 295, first domain accumulation 315, second domain accumulation 395, delayed second domain accumulation 415, and output signal 495) are eight bits wide to accommodate the extra most significant bits that may be generated by the accumulation function in the integrator 200.

As a non-limiting example, the bus widths may be related to the frequency of events. For example, if 32 events are possible in one clock cycle of the second clock 120, the bus width of the busses after the input signal 105 may need to be 5 plus a number dependent on frequency differences between domains plus the bus width of the input signal. The value of 5 is so the accumulator register can accumulate events over the span of the 32 clock cycles. As a result, if the input signal 105 is 8 bits, there may be 32 events (e.g., 5 bits), and it takes 4 clock cycles of the first clock 110 (e.g., 2 bits) to transmit to 1 clock cycle in the second clock domain 199, the bus width of all the busses except the input signal 105 may need to be 8+5+2=15 bits.

Figure 6:
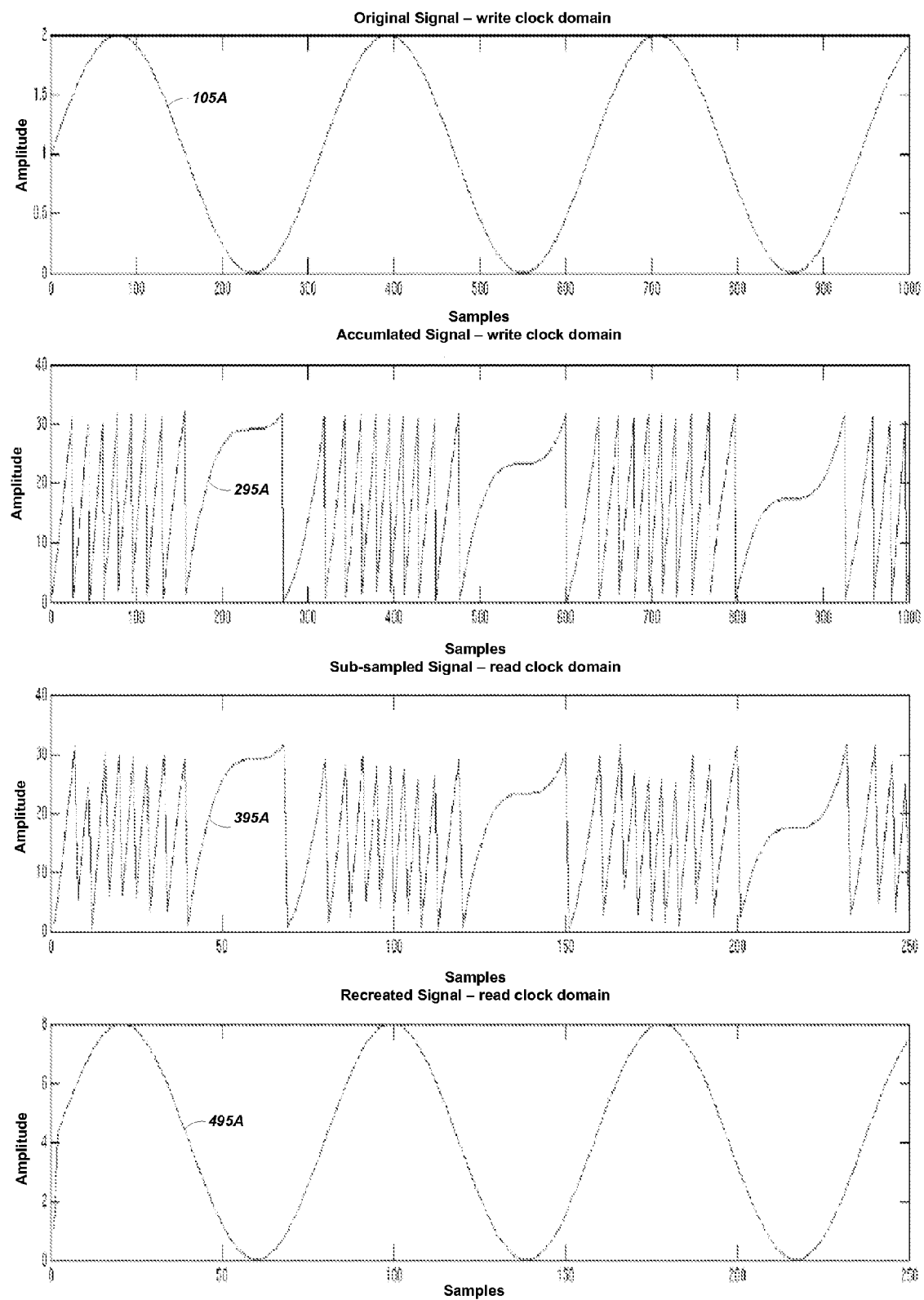
FIG. 6 illustrates waveforms for a first data type generated by various stages of one or more embodiments of the present invention.
Figure 7:
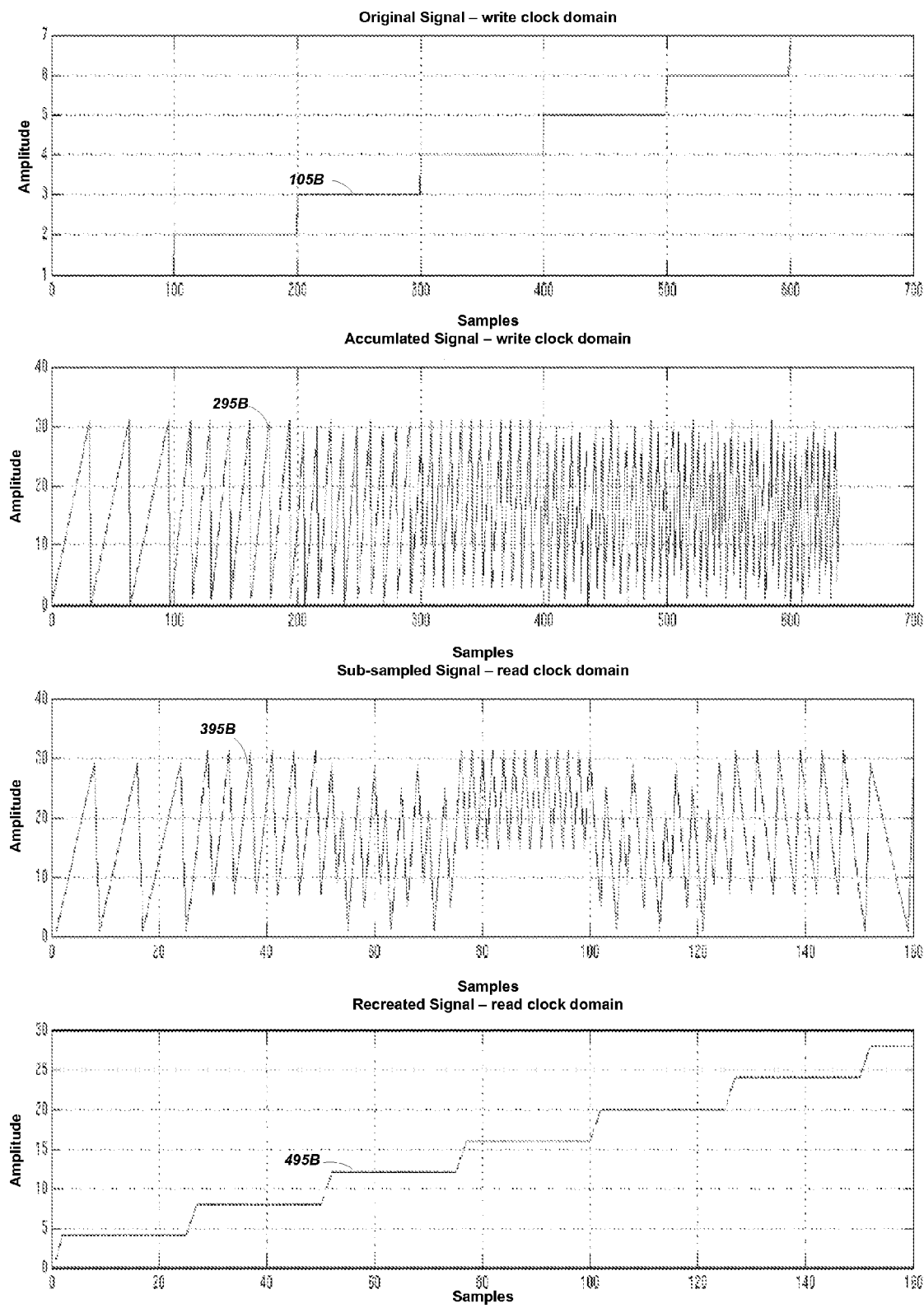
FIG. 7 illustrates waveforms for a second data type generated by various stages of one or more embodiments of the present invention.
Figure 8:
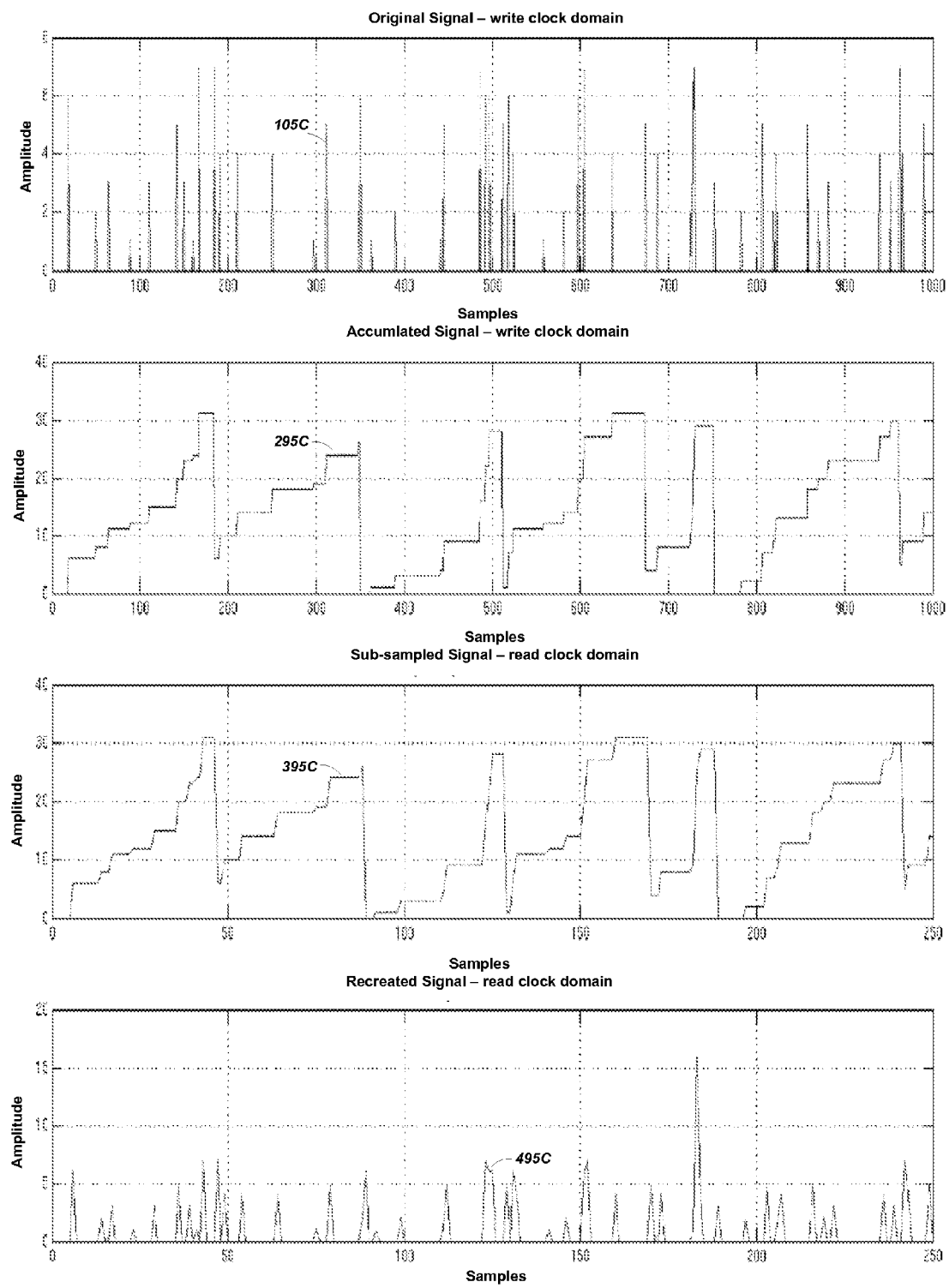
FIG. 8 illustrates waveforms for a third data type generated by various stages of one or more embodiments of the present invention.

FIGS. 6-8 illustrate example waveforms at various stages within embodiments of the present invention. When discussing FIGS. 6-8, reference will also be made to FIG. 1. In the example signals shown in FIG. 6-8, $f_1/f_2=4$. In other words, the second clock 120 is four times slower than the first clock 110. Thus, the number of samples shown for the input signal 105A-105C and the accumulation result 295A-295C is 1000, whereas the number of samples shown for the second domain accumulation 395A-395C and the output information 495A-495C is 250.

FIG. 6 illustrates waveforms for a first data type generated by various stages of one or more embodiments of the present invention. The input signal 105A illustrates a sine wave as the input information 105A in the first clock domain. After integration, the accumulation result 295A is shown in the first clock domain 101. The second domain accumulation 395A is shown after transfer to the second clock domain 199 and the output information 495A is shown after the differentiation in the second clock domain 199. As can be seen, the sine wave on the output information 495A in the second clock domain 199 looks similar to the input information 105A in the first clock domain 101 except for a phase lag due to the timing delays through the clock crossing system 100. Furthermore, the overall nature of the signal is preserved and the sum of the samples for the input information 105A in the first clock domain 101 is the same as the sum of the samples for the output information 495A in the second clock domain 199.

Also of note is that the amplitude of the output information 495A is 4 times that of the input information 105A. The clock crossing system 100 automatically accomplishes this amplitude adjustment to adjust for the sub-sampling factor of 4 and to maintain the characteristic that the sum of the samples for the input information 105A is the same as the sum of the samples for the output information 495A.

FIG. 7 illustrates waveforms for a second data type generated by various stages of one or more embodiments of the present invention. The input signal 105B illustrates a ramp-step hybrid signal as the input information 105B in the first clock domain 101. After integration, the accumulation result 295B is shown in the first clock domain 101. The second domain accumulation 395B is shown after transfer to the second clock domain 199 and the output information 495B is shown after the differentiation in the second clock domain 199. As can be seen, the ramp-step hybrid signal on the output information 495B in the second clock domain 199 looks similar to the input information 105B in the first clock domain 101 except for a phase lag due to the timing delays through the clock crossing system 100. Furthermore, the overall nature of the signal is preserved and the sum of the samples for the input information 105B in the first clock domain 101 is the same as the sum of the samples for the output information 495B in the second clock domain 199. Also of note is the amplitude of the output information 495 is 4 times that of the input information 105. The clock crossing system 100 automatically accomplishes this amplitude adjustment to adjust for the sub-sampling factor of 4 and to maintain the characteristic that the sum of the samples for the input information 105B is the same as the sum of the samples for the output information 495B.

FIG. 8 illustrates waveforms for a third data type generated by various stages of one or more embodiments of the present invention. The input signal 105C illustrates a random spike signal as the input information 105C in the first clock domain 101. After integration, the accumulation result 295C is shown in the first clock domain 101. The second domain accumulation 395C is shown after transfer to the second clock domain 199 and the output information 495C is shown after the differentiation in the second clock domain 199. As can be seen, the random spike signal on the output information 495C in the second clock domain 199 looks similar to the input information 105C in the first clock domain except for a phase lag due to the timing delays through the clock crossing system 100. Furthermore, the overall nature of the signal is preserved and the sum of the samples for the input information 105C (i.e., area under the curve) in the first clock domain 101 is the same as the sum of the samples for the output information 495C in the second clock domain 199. Also of note is that the amplitude of the output information 495C is equal that of the input information 105. The clock crossing system 100 automatically accomplishes this amplitude adjustment to adjust for the sub-sampling factor of 4 and to maintain the characteristic that the sum of the samples for the input information 105C is the same as the sum of the samples for the output information 495C. Where input spikes are relatively far apart, the output spikes are replicas of the input spikes. Where input spikes are relatively close together, an output spike may be the accumulation of multiple input spikes over a selected time period. However, the sum of the amplitudes of the single output spike is equal to the sum of the amplitudes of the multiple input spikes.

While the present invention has been described herein with respect to certain preferred embodiments, those of ordinary skill in the art will recognize and appreciate that it is not so limited. Rather, many additions, deletions, and modifications to the preferred embodiments may be made without departing from the scope of the invention as hereinafter claimed. In addition, features from one embodiment may be combined with features of another embodiment while still being encompassed within the scope of the invention as contemplated by the inventors.

What is claimed is:

1. An apparatus for crossing clock domains, comprising:
   an integrator configured for accumulating input information in a first clock domain to generate an accumulation result;
   clock-domain-crossing circuitry configured for:
      sampling the accumulation result in the first clock domain after each of a repeating accumulation count in the first clock domain to generate a first domain accumulation;
      generating a time delay after sampling the accumulation result; and
      sampling the first domain accumulation in a second clock domain after the time delay to generate a second domain accumulation; and
   a differentiator configured for generating output information in the second clock domain by delaying the second domain accumulation and subtracting the delayed second domain accumulation from the second domain accumulation.

2. The apparatus for crossing clock domains of claim 1, wherein the repeating accumulation count equals one.

3. The apparatus for crossing clock domains of claim 1, wherein the repeating accumulation count is at least a frequency of a clock in the first clock domain divided by a frequency of a clock in the second clock domain.

4. The apparatus for crossing clock domains of claim 1, wherein the repeating accumulation count is $2^N$ clock cycles in the first clock domain and $2^N > 1+(4*(f_{clk1}/f_{clk2})) > 2^{N-1}$ and wherein $f_{clk1}$ is a frequency of a clock in the first clock domain and $f_{clk2}$ is a frequency of a clock in the second clock domain.

5. The apparatus for crossing clock domains of claim 1, wherein the clock-domain-crossing circuitry includes circuitry for generating the time delay, comprising:
   a sample generator configured to generate a first domain sample pulse in the first clock domain after each repeating accumulation count;
   a transition generator configured to generate a transition on a synchronization signal in the first clock domain for each first domain sample pulse;
   a shift register configured for shifting the transition on the synchronization signal in the second clock domain; and
   a transition detector configured for generating a second domain sample pulse responsive to a transition at a last bit of the shift register.

6. The apparatus for crossing clock domains of claim 1, wherein the clock-domain-crossing circuitry includes circuitry for generating the time delay, comprising:
   a sample generator configured to generate a first domain sample pulse in the first clock domain after each repeating accumulation count;
   a meta-flop configured to sample the first domain sample pulse in the second clock domain; and
   a pulse generator configured for generating a second domain sample pulse responsive to an output of the meta-flop.

7. The apparatus for crossing clock domains of claim 1, wherein the integrator comprises:
   an accumulation register for operation in the first clock domain and comprising an input operably coupled to an adder output and an output operably coupled to the accumulation result; and an adder comprising a first addend operably coupled to an input signal conveying the input information, a second addend operably coupled to the accumulation result, and the adder output.

8. The apparatus for crossing clock domains of claim 1, wherein the differentiator comprises:
a differentiation register for operation in the second clock domain and comprising an input operably coupled to the second domain accumulation and an output operably coupled to the delayed second domain accumulation; and
a subtractor comprising a positive input operably coupled to the second domain accumulation, a negative input operably coupled to the delayed second domain accumulation, and an output signal comprising the output information.

9. A apparatus for crossing clock domains, comprising:
an input signal comprising input information at a first clock frequency;
an integrator, comprising:
an adder comprising a first addend operably coupled to the input signal, a second addend operably coupled to an accumulation result, and an adder output; and
an accumulation register configured for clocking at the first clock frequency and comprising an input operably coupled to the adder output and an output operably coupled to the accumulation result;
clock-domain-crossing circuitry, comprising:
a first domain register configured to be clocked at the first clock frequency and to load the accumulation result at a repeating accumulation count of the first clock frequency;
a second domain register configured to be clocked at a second clock frequency and to load an output of the first domain register a time delay after the first domain register is loaded to generate a second domain accumulation; and
a delay circuit configured for generating the time delay; and
a differentiator, comprising:
a differentiation register configured for clocking at the second clock frequency and comprising an input operably coupled to the second domain accumulation and an output operably coupled to a delayed second domain accumulation; and
a subtractor comprising a positive input operably coupled to the second domain accumulation, a negative input operably coupled to the delayed second domain accumulation, and an output signal comprising output information at the second clock frequency.

10. The apparatus for crossing clock domains of claim 9, wherein the repeating accumulation count equals one.

11. The apparatus for crossing clock domains of claim 9, wherein the repeating accumulation count is at least the first clock frequency divided by the second clock frequency.

12. The apparatus for crossing clock domains of claim 9, wherein the repeating accumulation count is $2^N$ clock cycles and $2^N>1+(4*(f_{clk1}/f_{clk2}))>2^{N-1}$ and wherein $f_{clk1}$ is the first clock frequency and $f_{clk2}$ is the second clock frequency.

13. The apparatus for crossing clock domains of claim 9, wherein the delay circuit comprises:
a sample generator configured to be clocked at the first clock frequency and to generate first domain sample pulses for each repeating accumulation count;
a transition generator configured to be clocked at the first clock frequency and to generate a transition on a synchronization signal for each of the first domain sample pulses;
a shift register configured to shift the synchronization signal through a plurality of flip-flops clocked at the second clock frequency; and
a transition detector configured to be clocked at the second clock frequency and generate second domain sample pulses responsive to transitions of an output of the shift register; and
wherein the time delay is a difference between the first domain sample pulses relative to corresponding second domain sample pulses.

14. The apparatus for crossing clock domains of claim 9, wherein the delay circuit comprises:
a sample generator configured to be clocked the first clock frequency and to generate first domain sample pulses after each repeating accumulation count;
a shift register configured to shift the first domain sample pulses through a plurality of flip-flops clocked at the second clock frequency; and
a pulse generator configured to be clocked the second clock frequency and to generate second domain sample pulses responsive to an edge of an output of the shift register; and
wherein the time delay is a difference between the first domain sample pulses relative to corresponding second domain sample pulses.

15. A method of passing data between different clock domains, comprising:
accumulating input information in a first clock domain by adding input samples to an accumulation result to generate the accumulation result;
sampling the accumulation result in the first clock domain after each of a repeating accumulation count to generate a first domain accumulation;
sampling the first domain accumulation in a second clock domain a time delay after the sampling the accumulation result to generate a second domain accumulation;
delaying the second domain accumulation by a clock cycle of the second clock domain; and
subtracting the delayed second domain accumulation from the second domain accumulation to generate output information in the second clock domain.

16. The method of claim 15, wherein the repeating accumulation count equals one.

17. The method of claim 15, wherein the repeating accumulation count is a frequency of a clock in the first clock domain divided by a frequency of a clock in the second clock domain.

18. The method of claim 15, wherein the repeating accumulation count is $2^N$ clock cycles and $2^N>1+(4*(f_{clk1}/f_{clk2}))>2^{N-1}$ and wherein $f_{clk1}$ is a frequency of a clock in the first clock domain and $f_{clk2}$ is a frequency of a clock in the second clock domain.

19. The method of claim 15, wherein sampling the first domain accumulation in the second clock domain further comprises:
generating a transfer signal for each repeating accumulation count;
converting the transfer signal from the first clock domain to the second clock domain to generate a second domain transfer signal; and
sampling the first domain accumulation in the second clock domain responsive to each second domain transfer signal.

20. The method of claim 15, wherein sampling the first domain accumulation in the second clock domain further comprises:
- generating first domain sample pulses in the first clock domain for each repeating accumulation count;
- transferring the first domain sample pulses from the first clock domain to the second clock domain to generate second domain sample pulses; and
- sampling the first domain accumulation in the second clock domain responsive to each of the second domain sample pulses.

21. The method of claim 15, wherein sampling the first domain accumulation in the second clock domain further comprises:
- generating first domain sample pulses in the first clock domain after each repeating accumulation count;
- generating a transition on a synchronization signal for each of the first domain sample pulses;
- transferring the synchronization signal from the first clock domain to the second clock domain to generate a second domain synchronization signal; and
- sampling the first domain accumulation in the second clock domain responsive to each transition on the second domain synchronization signal.

22. The method of claim 15, wherein the accumulating input information further comprises clocking the accumulation result into an accumulation register at each clock in the first clock domain.

23. A method of passing data between different clock domains by preserving temporal characteristics of input information in a first clock domain when it is transferred to a second clock domain, the method comprising:
- adding input samples of the input information to an accumulation result at each clock in the first clock domain to generate the accumulation result;
- generating a sample signal in the first clock domain for a last clock cycle of a span of consecutive clock cycles;
- sampling the accumulation result in the first clock domain responsive to the sample signal to generate a first domain accumulation;
- synchronizing the sample signal to the second clock domain to generate a second sample signal;
- sampling the first domain accumulation in the second clock domain responsive to the second sample signal to generate a second domain accumulation;
- generating a delayed second domain accumulation by sampling the second domain accumulation; and
- subtracting the delayed second domain accumulation from the second domain accumulation to generate output information with preserved temporal characteristics relative to the input information.

24. The method of claim 23, wherein sampling the first domain accumulation in the second clock domain further comprises:
- generating a transfer signal for each repeating accumulation count;
- converting the transfer signal from the first clock domain to the second clock domain to generate a second domain transfer signal; and
- sampling the first domain accumulation in the second clock domain responsive to each second domain transfer signal.

25. The method of claim 23, wherein the preserved temporal characteristics, which comprise a sum of input samples over a selected time period, equal a sum of output samples for the output information over the selected time period.

* * * * *